(12) United States Patent
Ishii et al.

(10) Patent No.: US 11,866,059 B2
(45) Date of Patent: Jan. 9, 2024

(54) VEHICLE CONTROLLER

(71) Applicant: Hitachi Astemo, Ltd., Hitachinaka (JP)

(72) Inventors: Takaya Ishii, Ibaraki (JP); Masashi Seimiya, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 81 days.

(21) Appl. No.: 17/616,929

(22) PCT Filed: Jul. 17, 2020

(86) PCT No.: PCT/JP2020/027779
§ 371 (c)(1),
(2) Date: Dec. 6, 2021

(87) PCT Pub. No.: WO2021/020154
PCT Pub. Date: Feb. 4, 2021

(65) Prior Publication Data
US 2022/0315023 A1 Oct. 6, 2022

(30) Foreign Application Priority Data
Aug. 1, 2019 (JP) ................. 2019-141983

(51) Int. Cl.
*B60W 50/06* (2006.01)
*B60W 50/14* (2020.01)
*B60W 60/00* (2020.01)

(52) U.S. Cl.
CPC ............ *B60W 50/06* (2013.01); *B60W 50/14* (2013.01); *B60W 60/001* (2020.02)

(58) Field of Classification Search
CPC .................................................. B60W 60/001
See application file for complete search history.

(56) References Cited

U.S. PATENT DOCUMENTS

2017/0313297 A1 11/2017 Okada et al.

FOREIGN PATENT DOCUMENTS

JP 2016-099635 A 5/2016
JP 2018-005538 A 1/2018
(Continued)

OTHER PUBLICATIONS

JP 2018005538A English Translation (Year: 2018).*
International Search Report, PCT/JP2020/027779, dated Oct. 27, 2020 (2 pgs).

*Primary Examiner* — Abby Y Lin
*Assistant Examiner* — Renee LaRose
(74) *Attorney, Agent, or Firm* — Volpe Koenig (57) ABSTRACT

A route information storage function having decreased data storage requirements is provided in a vehicle controller that includes a processor, a first storage unit, and a second storage unit and that stores route information indicating a route to a target point. The vehicle controller includes a traveling state acquiring unit that acquires route information on a vehicle, a short-term storage information processing unit that stores the route information in the first storage unit, as short-term storage information, the route information being acquired by the traveling state acquiring unit while the vehicle is traveling, and a long-term storage information processing unit that after the vehicle has reached the target point, determines long-term storage information from short-term storage information stored in the first storage unit, the long-term storage information processing unit storing the determined long-term storage information in the second storage unit.

5 Claims, 9 Drawing Sheets

(56) References Cited

FOREIGN PATENT DOCUMENTS

| JP | 2018005538 A | * | 1/2018 |
| JP | 2018-022353 A | | 2/2018 |

* cited by examiner

VEHICLE CONTROLLER

TECHNICAL FIELD

The present invention relates to a vehicle controller that carries out driving assist.

BACKGROUND ART

A vehicle controller has been known for years, which, to provide an autonomous driving system or a parking assist system for vehicles, stores route information calculated from a traveling locus of a subject vehicle and surrounding environment information, such as an object near the subject vehicle and a white line, acquired during traveling, and carries out vehicle control, using the stored route information and surrounding environment information (see, for example, PTL 1.).

Surrounding environment information on the subject vehicle includes location information of an object, such as a stationary object or a moving object present near the subject vehicle, and information on an external surrounding condition including road markings (road paint), such as white lines and stop lines on the road surface, and traffic lights/speed signs present around the road.

The vehicle controller needs to determine whether an object is a stationary object or a moving object, i.e., determines the type of the object and detect the location, the speed, or the like of the object. The vehicle controller needs also to determine the location of a white line and the meaning of a traffic sign on the road where the subject vehicle is running.

Detecting surrounding environment information on the subject vehicle in this manner requires external sensors. As external sensors, for example, a camera utilizing an image recognition technology, a sonar utilizing an ultrasonic technology, and a millimeter wave radar using radio waves with short wavelengths work effectively.

Route information can be calculated by cyclically acquiring the location of the subject vehicle during its traveling. Methods of acquiring the location of the subject vehicle vary depending on a configuration of a system. Known methods of acquiring the location of the subject vehicle include a method using a global navigation satellite system (GNSS), a method called dead reckoning, which uses information acquired by internal sensors, such as a wheel speed sensor, a steering angle sensor, an acceleration sensor, and a gyro sensor, to estimate the location of the subject vehicle, and a method of calculating the location of the subject vehicle on the basis of a relative location relationship between the subject vehicle and an object present near the subject vehicle.

CITATION LIST

Patent Literature

PTL 1: Japanese Patent Application Laid-Open No. 2016-99635

SUMMARY OF INVENTION

Technical Problem

Route information is used as a vehicle guide route in the autonomous driving system or the parking assist system. It is therefore desirable that the route information be precise as much as possible and be acquired at short cycles. It is expected, in this case, that the route information acquired in a section between a storage start point and a storage end point turns out to be data of an enormous size. In addition, because the vehicle controller uses acquired route information in the next and subsequent trips, the vehicle controller has a function of storing the route information in a nonvolatile memory, such as a flash memory or an EEPROM.

For example, a scene where route information of a certain 1 km-long section is stored is assumed. In this scene, the subject vehicle acquires three pieces of data indicative respectively of a latitude, a longitude, and a yaw angle every time the subject vehicle travels 1 m, and stores the acquired pieces of data as single-precision floating-point data, in a nonvolatile memory. At this time, the data to be stored amounts to 12 kilobytes in total, which means that to store the route information, the vehicle controller must be equipped with a nonvolatile memory having a capacity of 12 kilobytes or more.

Because the unit price of the nonvolatile memory increases in proportional to its storage capacity, the manufacturing cost of the vehicle controller increases as the data size of the route information to be stored increases.

The present invention has been conceived in view of the above problem, and it is an object of the present invention to reduce the data size of route information stored in a nonvolatile memory by, when executing a route information storage process, extracting only the route information with a high feature level from pieces of route information after reaching a storage end point and storing the extracted route information in the nonvolatile memory.

Solution to Problem

The present invention is a vehicle controller that includes a processor, a first storage unit, and a second storage unit and that stores route information indicating a route to a target point. The vehicle controller includes: a traveling state acquiring unit that acquires route information on a vehicle; a short-term storage information processing unit that stores the route information in the first storage unit, as short-term storage information, the route information being acquired by the traveling state acquiring unit while the vehicle is traveling; and a long-term storage information processing unit that after the vehicle has reached the target point, determines long-term storage information from short-term storage information stored in the first storage unit, the long-term storage information processing unit storing the determined long-term storage information in the second storage unit.

Advantageous Effects of Invention

According to the present invention, because only the route information with a high feature level is stored in the second storage unit (nonvolatile memory), the data size of the route information stored in the second storage unit, compared with a case where the present invention is not applied, can be reduced. In addition, the route information to be stored in the second storage unit is determined after the vehicle reaches the target point (storage end point). This allows a feature level to be calculated based on all pieces of route information acquired during travel from a storage start point to a storage end point. The effect of noise included in the route information, therefore, can be minimized.

Details of at least one embodiment of the subject matter disclosed herein will be set forth in the accompanying drawings and the following description. Other features, aspects, and effects of the disclosed subject matter will be made clear through the following descriptions, drawings, and claims.

DESCRIPTION OF EMBODIMENTS

Embodiments of the present invention will hereinafter be described with reference to the drawings. In the present embodiment, an example will be described, in which route information of a route extending from a storage start point to a storage end point, the route information being set by a driver, is stored, and traveling assist (vehicle control) for an automobile, such as autonomous driving or autonomous parking, is performed based on the stored route information.

Figure 1:
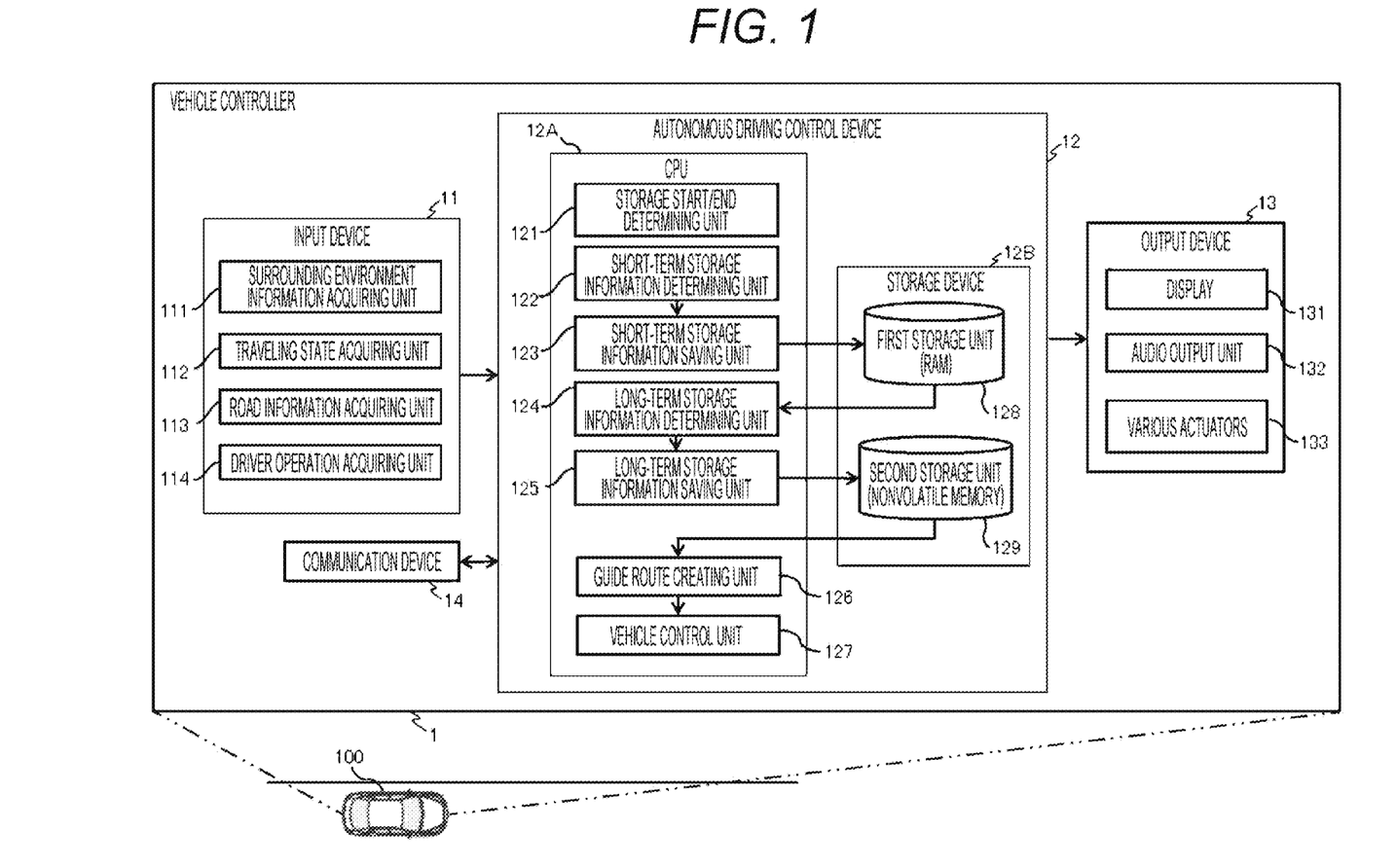
FIG. 1 is a block diagram of an example of functional units of a vehicle controller, showing an embodiment of the present invention.

FIG. 1 is a block diagram of an example of functional units of a vehicle controller 1 to which the present invention is applied. The vehicle controller 1 shown in FIG. 1 is incorporated in a vehicle 100, and provides the vehicle 100 with traveling assist. The vehicle controller 1 can cause the vehicle 100 to autonomously travel to a preset target point, and, when the target point is in a parking frame, can cause the vehicle 100 to autonomously park.

As shown in FIG. 1, the vehicle controller 1 includes an input device 11, an autonomous driving control device 12, an output device 13, and a communication device 14.

The input device 11 is a device that acquires various pieces of information necessary for providing the vehicle 100 with traveling assist. The input device 11 includes, for example, a surrounding environment information acquiring unit 111, a traveling state acquiring unit 112, a road information acquiring unit 113, and a driver operation acquiring unit 114.

The input device 11 is connected to the autonomous driving control device 12, and outputs pieces of information acquired respectively by the surrounding environment information acquiring unit 111, the traveling state acquiring unit 112, the road information acquiring unit 113, and the driver operation acquiring unit 114, to the autonomous driving control device 12.

The surrounding environment information acquiring unit 111 acquires information on an object present near the vehicle 100 and information on an external surrounding condition including road markings (road paint), such as white lines and stop lines on the road surface, and solid objects, such as traffic lights and speed signs, present around the road. As the surrounding environment information acquiring unit 111, for example, an external sensor, such as a camera, a 77 GHz radar, a 24 GHz radar, a short range LiDAR, a long range LiDAR, and a sonar sensor (all of which are not illustrated), is used.

The surrounding environment information acquiring unit 111 processes information on the external surrounding condition acquired from such an external sensor, thereby acquiring, for example, information indicating the state of movement, the color, the shape, and the like of an object, and outputs the acquired information to the autonomous driving control device 12.

The traveling state acquiring unit 112 functions as, for example, a means for acquiring a traveling state (route information) of the vehicle 100, such as location information, traveling direction information, and speed information on the vehicle 100. The traveling state acquiring unit 112 uses, for example, a method using a global navigation satellite system (GNSS) or a method called dead reckoning, which uses information acquired by internal sensors, such as a gyro sensor, an acceleration sensor, and a wheel speed sensor (all of which are not illustrated), to estimate the location of the vehicle 100 (subject vehicle). Alternatively, the traveling state acquiring unit 112 may calculate the location of the vehicle 100 (subject vehicle) from a relative location relationship between the vehicle 100 and an object, the relative location relationship being acquired by the surrounding environment information acquiring unit 111.

The method using the GNSS offers an advantage of being able to acquire location information indicating the location of the vehicle 100 on the earth, but at the same time, has a disadvantage that ensuring measurement precision is difficult and that, depending on a place where the vehicle travels, location information cannot be acquired in some cases.

The dead reckoning method offers an advantage of being able to acquire the exact location of the vehicle 100 (subject vehicle) regardless of a place where the vehicle 100 travels, but has a disadvantage of accumulating noises and errors. The method of calculating the location of the vehicle 100 (subject vehicle) from its relative location relationship with a nearby object allows acquisition of the location of the vehicle 100 (subject vehicle) in a situation where the surrounding environment information acquiring unit 111 works normally. The precision of the method, however, depends on an external sensor.

The road information acquiring unit 113 acquires, for example, road network information (map information) including nodes and links, traffic rule information, and traffic safety facility information. The road network information includes road structure information, such as node details information (crossroads, T-junctions, etc.) and link details information (number of lanes, lane shapes, etc.).

Traffic rule information refers to a concept including not only the traffic regulations but also traffic manners commonly observed by people. Traffic safety facility information refers to equipment/facilities, such as traffic lights and road signs, intended as traffic safety measures for drivers to recognize. The road information acquiring unit 113 may acquire these pieces of information from a storage medium storing the information therein, or may acquire the information from a server on a network via the communication device 14 on a necessary basis.

The driver operation acquiring unit 114 acquires an input operation the driver carries out on the vehicle 100. Input operations include, for example, turning on/off a steering switch (not illustrated) and touching the screen of a car navigation device (not illustrated). In addition to these operations, the driver operation acquiring unit 114 may read the driver's facial expression or motion, using a driver monitoring camera, or capturing the driver's voice through a microphone, thus acquiring such an expression or voice as the driver's input operation.

The communication device 14 is a device that transmits/receives information to/from a device not installed in the vehicle 100. For example, the communication device 14 receives information detected by a sensor installed in a road infrastructure, road surrounding information (road surface information, object information, and the like) stored in an external data center, and road surrounding information (road surface information, object information, and the like) detected by a different vehicle.

The communication device 14 can also transmit/receive the latest road information on the surroundings of the vehicle 100, to/from the road information acquiring unit 113. Further, the communication device 14 can acquire various instructions to the vehicle 100, the instructions being transmitted to the vehicle 100 by the owner of the vehicle 100 via a mobile phone, or transmit the state of the vehicle 100 to the mobile phone the owner is using.

The autonomous driving control device 12 carries out information processing related to traveling assist. The autonomous driving control device 12 is composed mainly of a computer including a CPU 12A and a storage device 12B. The CPU 12A, for example, causes a storage start/end determining unit 121, a short-term storage information determining unit 122, a short-term storage information saving unit 123, a long-term storage information determining unit 124, a long-term storage information saving unit 125, a guide route creating unit 126, and a vehicle control unit 127, to exert their functions.

The CPU 12A may be a single core CPU or a multi-core CPU. The storage device 12B includes a first storage unit 128 (RAM) and a second storage unit 129 (nonvolatile memory). The RAM and the nonvolatile memory may be built in the same chip containing the CPU 12A, or may be attached to the chip as external elements.

The storage start/end determining unit 121, the short-term storage information determining unit 122, the short-term storage information saving unit 123, the long-term storage information determining unit 124, the long-term storage information saving unit 125, the guide route creating unit 126, and the vehicle control unit 127 are loaded as programs, from the second storage unit 129 onto the first storage unit 128, and are executed by the CPU 12A.

The CPU 12A executes a process according to a program for each functional unit, thereby operating as a functional unit that provides a given function. For example, the CPU 12A executes a process according to a vehicle control program, thus functioning as the vehicle control unit 127. In the same manner, the CPU 12A executes other processes according to other programs. Further, the CPU 12A also operates as a functional unit that provides respective functions for multiple tasks executed by each program. A computer and a computer system are a device and a system that include these functional units.

Based on various pieces of incoming information from the input device 11, the autonomous driving control device 12 calculates a control instruction value for controlling traveling of the vehicle 100, and outputs the control instruction value to the output device 13. The control instruction value mentioned here includes control information (acceleration/deceleration control information, steering control information), according to which a state of physical movement of the vehicle 100, such as its running, making a turn, and stopping, is changed via actuators, and signal information as well, according to which information is given to the driver via a display 131 (meter or the like) or an audio output unit 132 (speaker or the like).

The storage start/end determining unit 121 determines whether a route storage start request or route storage end request is made, based on the driver's input operation acquired from the driver operation acquiring unit 114, and makes a determination on whether or not to start or end route storage, based on verification of a fact that the vehicle 100 has approached a storage start point 41 or a storage end point 42 set in advance by the driver.

The storage start/end determining unit 121 also makes a determination on whether or not to start or end route storage, based on detection of a problem with the vehicle controller 1 or on conformation of a free space of the RAM, i.e., the first storage unit 128 or of the nonvolatile memory, i.e., the second storage unit 129. At this time, the storage start/end determining unit 121 informs the driver of the start or end of data storage, a failure in starting data storage, and the like, via the output device 13.

The short-term storage information determining unit 122 determines short-term storage information to be stored in the first storage unit 128 (RAM), from various pieces of information acquired by the input device 11 between the start of data storage and the end of data storage.

This short-term storage information is updated moment by moment at a given cycle, that is, it is treated as discrete time data. Data that is stored in the first storage unit 128 as short-term storage information should desirably be data that can be used as a guide route for autonomous driving and autonomous parking. Such data indicates, for example, the location of the vehicle 100 (subject vehicle), a yaw angle, a relative location with respect to an object near the vehicle, a cumulative traveling distance from the storage start point 41, and the like.

The short-term storage information determining unit 122 can evaluate a level of importance of the short-term storage information and assign an importance level to the short-term storage information. An importance level expresses how valuable the short-term storage information is when it is used as a guide route for autonomous driving or autonomous parking.

Location information of the storage start point 41 is used for determining whether or not to start autonomous traveling at the time of executing autonomous traveling, and is therefore evaluated high in importance level. In a case where the storage end point 42 is a parking location, since the precision of the parking location is required to be high, location information of the parking location is evaluated high in importance level.

Another case is assumed where, for example, the vehicle 100 travels while executing route storage in a certain section of a straight road and, while the vehicle 100 is traveling, the short-term storage information determining unit 122 acquires location information of the vehicle 100 (subject vehicle) at given cycles.

In this case, the short-term storage information determining unit 122 may make a determination on whether the road is straight, by acquiring curvature information on the road from the road information acquiring unit 113 or by acquiring yaw angle information on the vehicle 100 from the traveling state acquiring unit 112.

At this time, to calculate a guide route for traveling the straight road from the acquired short-term storage information, the short-term storage information determining unit 122 needs only the location information of the vehicle 100 (subject vehicle) at the start point and the end point of the section, and does not need the location information of the vehicle 100 (subject vehicle) in the route between the start point and the end point. In other words, in this case, the importance level of the location information of the vehicle 100 (subject vehicle) at the start point and the end point of the section is evaluated high, but the importance level of the location information of the vehicle 100 (subject vehicle) in other places is evaluated low.

The short-term storage information saving unit 123 stores the short-term storage information determined by the short-term storage information determining unit 122, in the first storage unit 128 (RAM). At this time, when other short-term storage information is already stored in the RAM, the short-term storage information to be saved is stored in a free space of the RAM so as not to overwrite the already stored information.

When the RAM has a shortage of free spaces, however, the short-term storage information saving unit 123 compares pieces of short-term storage information in importance level, and deletes pieces of short-term storage information with lower importance levels in order to secure free spaces. In addition, to allow understanding of the time-sequence order of pieces of short-term storage information to be saved, the short-term storage information saving unit 123 can assign index information to the short-term storage information and store the indexed short-term storage information in the first storage unit 128 (RAM).

Based on the short-term storage information stored in the first storage unit 128 (RAM) by the short-term storage information saving unit 123, the long-term storage information determining unit 124 calculates a feature level of each piece of short-term storage information, and determines only the short-term storage information with a feature level equal to or larger than a given value to be long-term storage information to be stored in the second storage unit 129 (nonvolatile memory).

The long-term storage information determining unit 124 can carry out data processing on short-term storage information to set processed data as updated short-term storage information. The long-term storage information determining unit 124 can also calculate a feature level from the updated short-term storage information.

The feature level, similar to the importance level, expresses how valuable short-term storage information is when it is used as a guide route for autonomous driving or autonomous parking. The importance level may be set as a feature level, or a feature level that provides only the information necessary for route creation may be set, based on a route creation algorithm of the guide route creating unit 126.

Further, the long-term storage information determining unit 124 can round off a numerical value for the long-term storage information, based on a guide route precision request. In general, the precision of a guide route is required in a case of autonomous traveling on the road and a case of autonomous parking at a parking location, and the higher precision is required in the latter case.

In other words, the precision of the guide route adopted in the case of autonomous traveling on the road may be set low, which poses no problem. This, in turn, allows the long-term storage information determining unit 124 to round off a numerical value for long-term storage information, which further reduce a data size. The long-term storage information determining unit 124, however, needs to attach information of a degree of rounding off the numerical value to the long-term storage information.

Whether the guide route is used for autonomous traveling on the road or for autonomous parking at the parking location can be determined, for example, in accordance with a determination on whether the distance to the parking location is equal to or larger than a given distance. In another case, the long-term storage information determining unit 124 may determine the use of the guide route by checking road information from the road information acquiring unit 113 to see whether the long-term storage information belongs to a public road or to a private land.

The long-term storage information saving unit 125 stores long-term storage information determined by the long-term storage information determining unit 124, in the second storage unit 129 (nonvolatile memory). At this time, when long-term storage information on a different guide route has already been stored in the second storage unit 129 (nonvolatile memory), the long-term storage information to be saved is stored in a free space of the second storage unit 129 (nonvolatile memory) so as not to overwrite the already stored information. Further, when the second storage unit 129 (non-volatile memory) has a shortage of free spaces, the long-term storage information saving unit 125 can output a signal (or message) informing the driver of the free space shortage, to the output device 13.

The guide route creating unit 126 creates a guide route for autonomous driving or autonomous parking, from long-term storage information stored by the long-term storage information saving unit 125. Guide route creation is executed during autonomous traveling of the vehicle 100 after the route information is stored.

The vehicle control unit 127 controls the vehicle 100 so that the vehicle 100 travels along the guide route created by the guide route creating unit 126. However, it is not always necessary to control the vehicle 100 to cause it to travel along the guide route. It is rather desirable that the vehicle 100 be controlled in such a way as to improve an occupant's comfortability or to avoid an obstacle that might be found on the guide route.

As shown in FIG. 1, the output device 13 includes the display 131, the audio output unit 132, and various actuators 133. The output device 13 is connected to the autonomous driving control device 12, and controls the display 131, the audio output unit 132, and the various actuators 133 according to a received control instruction value output from the autonomous driving control device 12.

The display 131 provides occupants of the vehicle 100, which include the driver, with various pieces of information, such as a guide route and a free space of the nonvolatile memory, in the form of visual information. The display 131 is, for example, an instrument panel or a display disposed close to the driver's seat of the vehicle 100. The display may be a head-up display. A portable information terminal, such as a mobile phone or so-called smartphone an occupant is carrying, a tablet personal computer, or the like may be used as a part of the display 131 or as the whole display 131 itself.

The audio output unit 132 provides occupants of the vehicle 100, which include the driver, with various pieces of information, such as a traveling assist cancellation alarm, a storage start announcement, and a storage end announcement, in the form of auditory information. The audio output unit 132 is, for example, a speaker or the like disposed close to the driver's seat of the vehicle 100.

The various actuators 133 change a steering angle, acceleration/deceleration, and a braking force of the vehicle 100, based on an incoming control instruction value from the autonomous driving control device 12.

Figure 2:
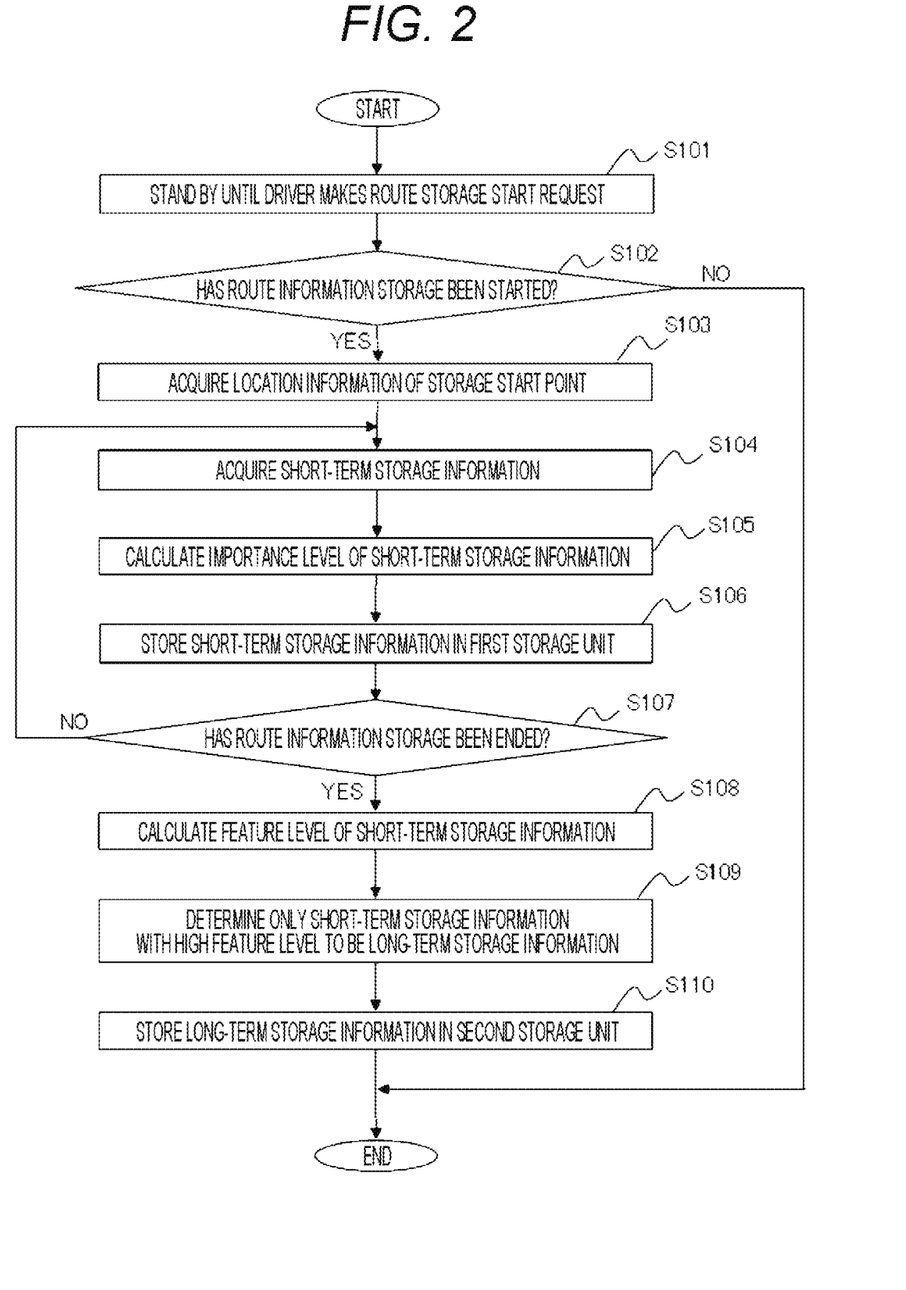
FIG. 2 is a flowchart of an example of processes that the vehicle controller executes when storing route information, showing the embodiment of the present invention.

Processes the vehicle controller 1 executes when storing route information will be described with reference to FIG. 2. FIG. 2 is a flowchart of an example of characteristic processes that the vehicle controller 1 executes when storing route information.

At step S101, the storage start/end determining unit 121 acquires an input operation from the driver operation acquiring unit 114, and determines whether the driver is requesting the start of route storage. When the driver is not requesting the start of the route storage, the storage start/end determining unit 121 does not start route information storage, and stands by until receiving the next input operation by the driver.

It should be noted that, at the time of route information storage, because the driver is driving the vehicle 100 in manual traveling mode, an input operation by using a steering switch, a voice, or the driver monitoring camera is preferable. When the storage start/end determining unit 121 determines that the driver is requesting the start of route storage, the vehicle controller 1 executes a process of step S102.

At step S102, the storage start/end determining unit 121 determines whether the vehicle controller 1 can start route information storage. Storage start conditions are set in advance, and include, for example, a condition that the second storage unit 129 (non-volatile memory) has no shortage of free spaces and a condition that the vehicle controller 1 has not detected a problem.

When the storage start conditions are not met, the storage start/end determining unit 121 does not start route information storage. When the storage start conditions are met, the vehicle controller 1 executes a process of step S103. It is desirable that the storage start/end determining unit 121 inform the driver of the result of a determination on whether route information storage has been started successfully or has not been started.

Figure 4:
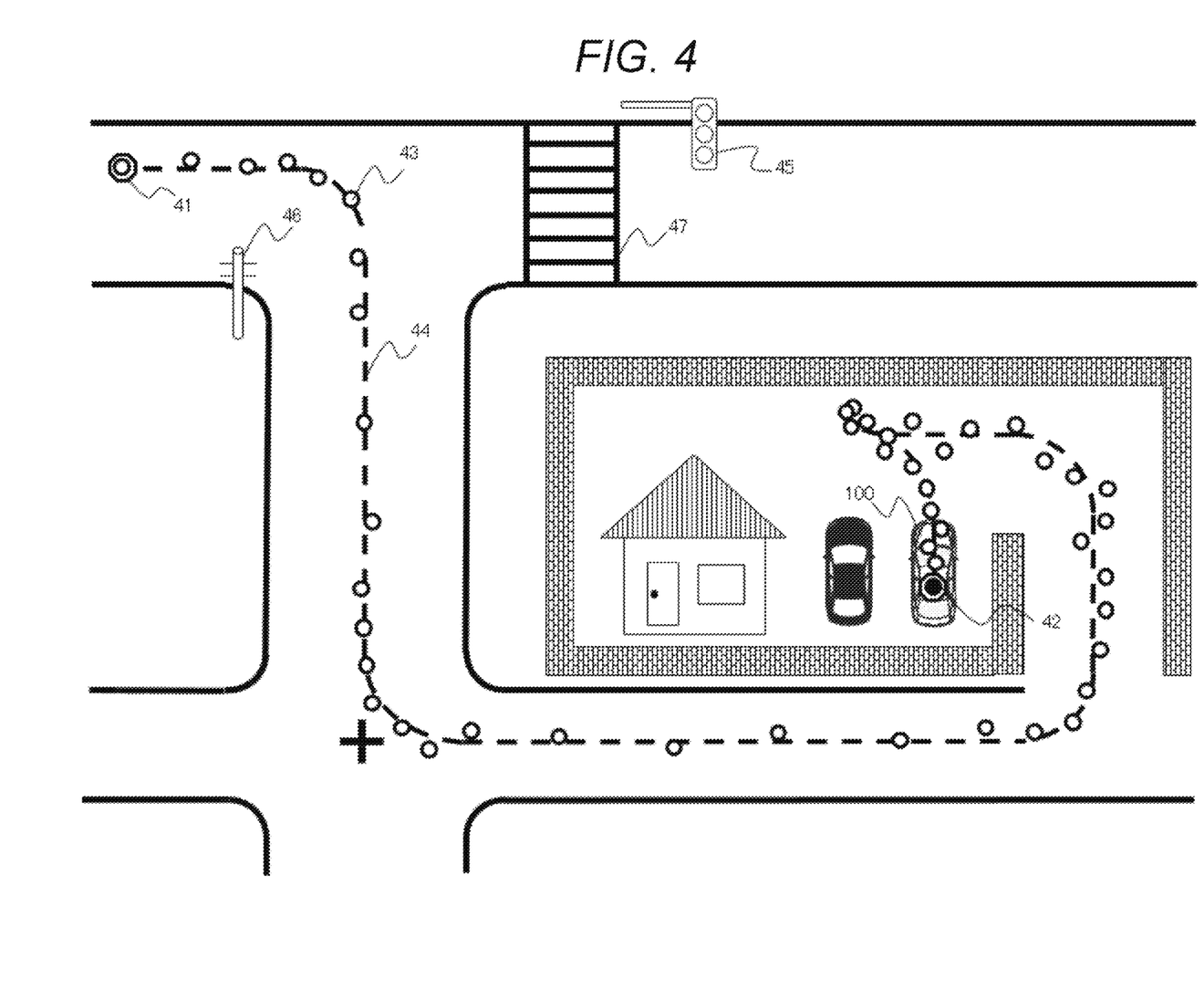
FIG. 4 is a plan view of a traveling environment in which a vehicle (subject vehicle) travels in a section between a storage start point and a storage end point and cyclically acquires subject vehicle location information during traveling, showing the embodiment of the present invention.

At step S103, the short-term storage information determining unit 122 acquires location information of the storage start point 41. The storage start point 41 is used to determine whether or not to start autonomous traveling, using storage information, and it is therefore desirable that the storage start point 41 be provided as invariable information. Such invariable information includes, for example, information of locations on the earth, such as latitude and longitude, and information of relative locations with respect to a stationary object (three-dimensional object), such as a traffic light 45 (FIG. 4), a telephone pole 46 (FIG. 4), and a crosswalk 47 (FIG. 4).

Subsequently, at step S104, the short-term storage information determining unit 122 acquires short-term storage information (e.g., the location of the vehicle 100, i.e., subject vehicle), and, at step S105, calculates the importance level of the short-term storage information. At step S106, the short-term storage information saving unit 123 stores the short-term storage information in the first storage unit 128 (RAM).

At step S107, the storage start/end determining unit 121 determines whether route information storage has ended. Storage end conditions include, for example, a condition that the vehicle controller 100 has reached the storage end point 42 and a condition that the driver has issued a storage end request.

At step S107, when the storage start/end determining unit 121 determines that route information storage has not ended, the process flow returns to step S104. When it is determined that route information storage has ended, the vehicle controller 1 executes step S108.

At step S108, the long-term storage information determining unit 124 calculates a feature level of each piece of short-term storage information. Calculation of the feature level will be described later. Subsequently, at step S109, the long-term storage information determining unit 124 determines only the short-term storage information with a feature level equal to or larger than a given value to be long-term storage information.

Figure 8:
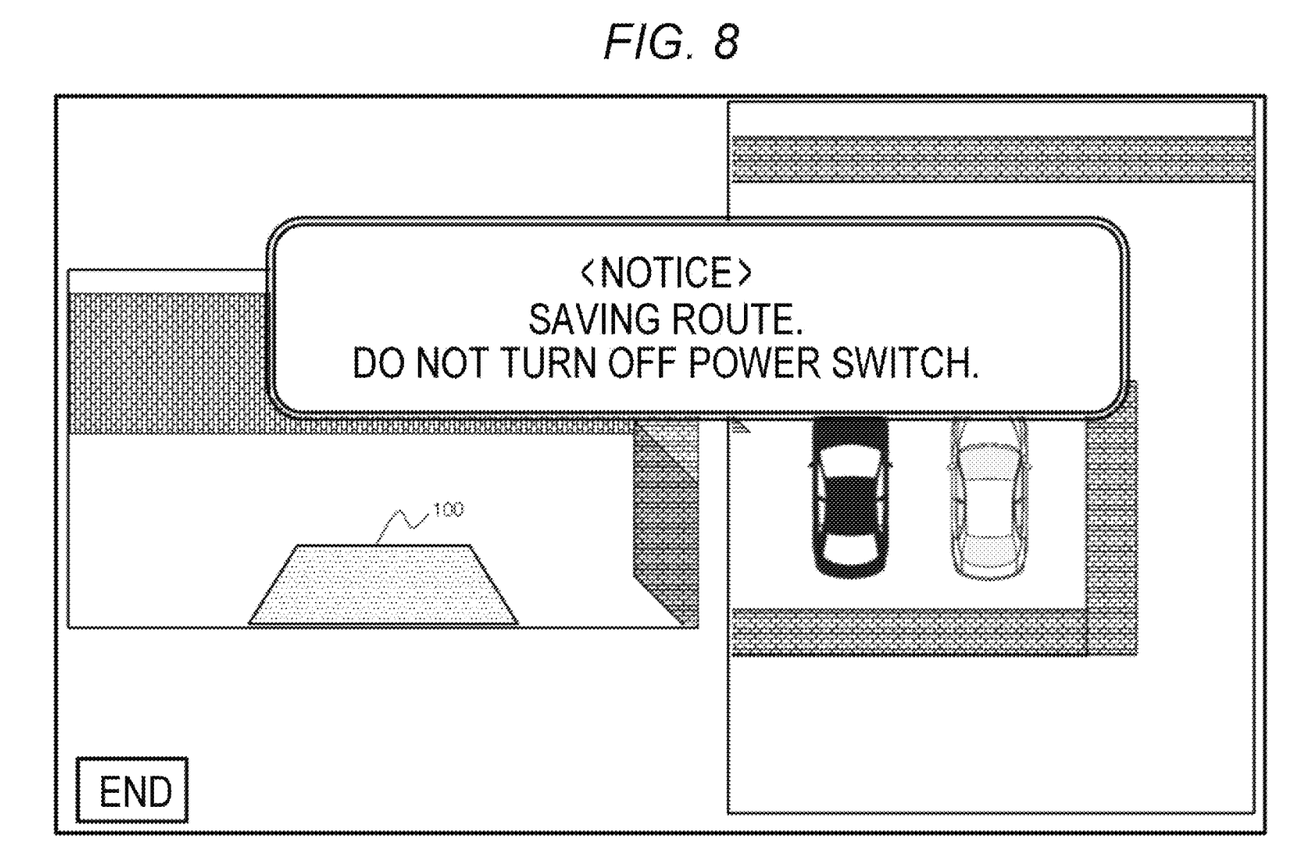
FIG. 8 depicts an image of a screen displaying a message informing a driver of a route being saved, showing the embodiment of the present invention.

At step S110, the long-term storage information saving unit 125 stores the long-term storage information determined at step S109, in the second storage unit 129 (non-volatile memory). At this time, as shown in FIG. 8, the driver is informed that a long-term storage information determining process is being executed and that a route is being saved. This prompts the driver to avoid turning off the power supply of the vehicle. FIG. 8 depicts an image of a screen of the display 131, the screen displaying a message informing the driver of a route being saved.

Now a specific example of calculation of a feature level, the calculation being carried out by the long-term storage information determining unit 124 at step S108, will be described with reference to FIGS. 4, 5, 6, and 7.

FIG. 4 is a plan view of a traveling environment in which the vehicle 100 in manual driving mode travels in a section between the storage start point 41 and the storage end point 42 and cyclically acquires subject vehicle location information 43 during traveling. It is assumed in this example that all pieces of subject vehicle location information 43 are stored in the first storage unit 128 (RAM), as short-term storage information. As indicated in FIG. 4, the subject vehicle location information 43 often includes various noises and errors, depending on an information acquisition method, and hardly matches an actual traveling locus 44 of the vehicle 100.

Figure 5:
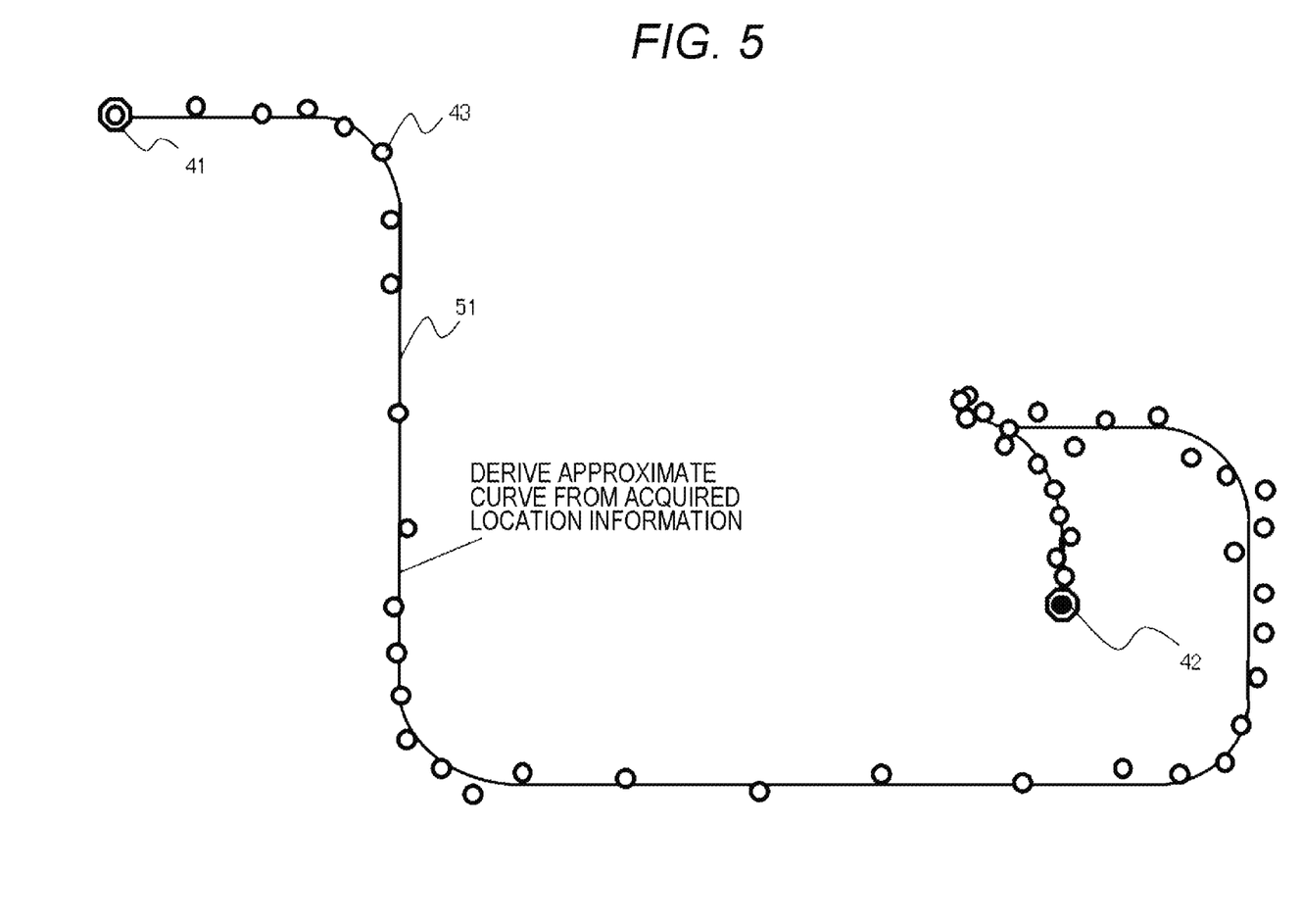
FIG. 5 is a plan view of an example of an approximate curve that is calculated from acquired pieces of subject vehicle location information, showing the embodiment of the present invention.

The long-term storage information determining unit 124 first carries out data processing, such as curve fitting, on short-term storage information. FIG. 5 is a diagram showing a case where curve fitting is carried out on acquired short-term storage information shown in FIG. 4 to calculate an approximate curve 51 extending from the storage start point 41 to the storage end point 42.

Curve fitting may be carried out using all pieces of short-term storage information or carried out on each of groups of short-term storage information, the groups each consisting of a given number of pieces of short-term storage information. When curve fitting is carried out on each group, it is desirable that the start point and the end point of an approximate curve calculated by the curve fitting be continuous with an approximate curve calculated from an adjacent group. It is also desirable that the order of a curve to fit and the number of pieces of information to be grouped be adjusted in accordance with the required location precision of a guide route.

The long-term storage information determining unit 124 sets the calculated approximate curve 51 shown in FIG. 5, as new short-term storage information, i.e., updated short-term storage information. In addition, the long-term storage information determining unit 124 calculates a feature level from the updated short-term storage information, and determines long-term storage information.

Figure 6:
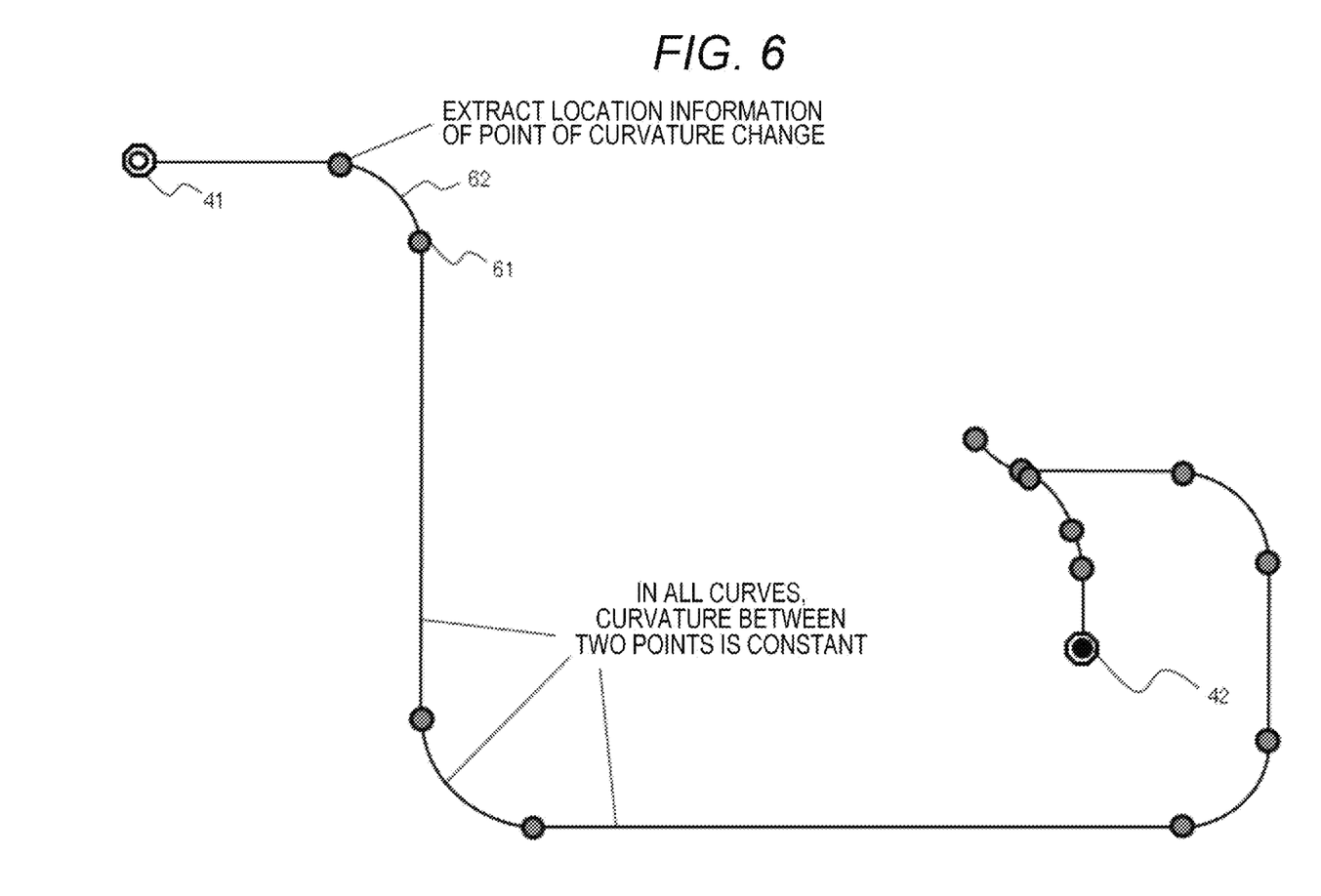
FIG. 6 is a plan view of an example in which only the points where a rate of change of a curvature is larger than 0 are extracted form an approximate curve, showing the embodiment of the present invention.

Here, an example in which a feature level is set as "a rate of change in curvature" of an approximate curve will be described. FIG. 6 is a diagram showing a case where only the points at which a rate of change in curvature is larger than 0 are extracted. For guide route creation, the long-term storage information determining unit 124 just needs location information 61 at each point and curvature information 62 between two points, both information being shown in FIG. 6. With these pieces of information, the long-term storage information determining unit 124 can create a guide route for autonomous driving and autonomous parking, according to an equation of a circle. In this example, therefore, the long-term storage information determining unit 124 determines the location information 61 at each point and the curvature information 62 between two points, both information being shown in FIG. 6, to be long-term storage information.

Figure 7:
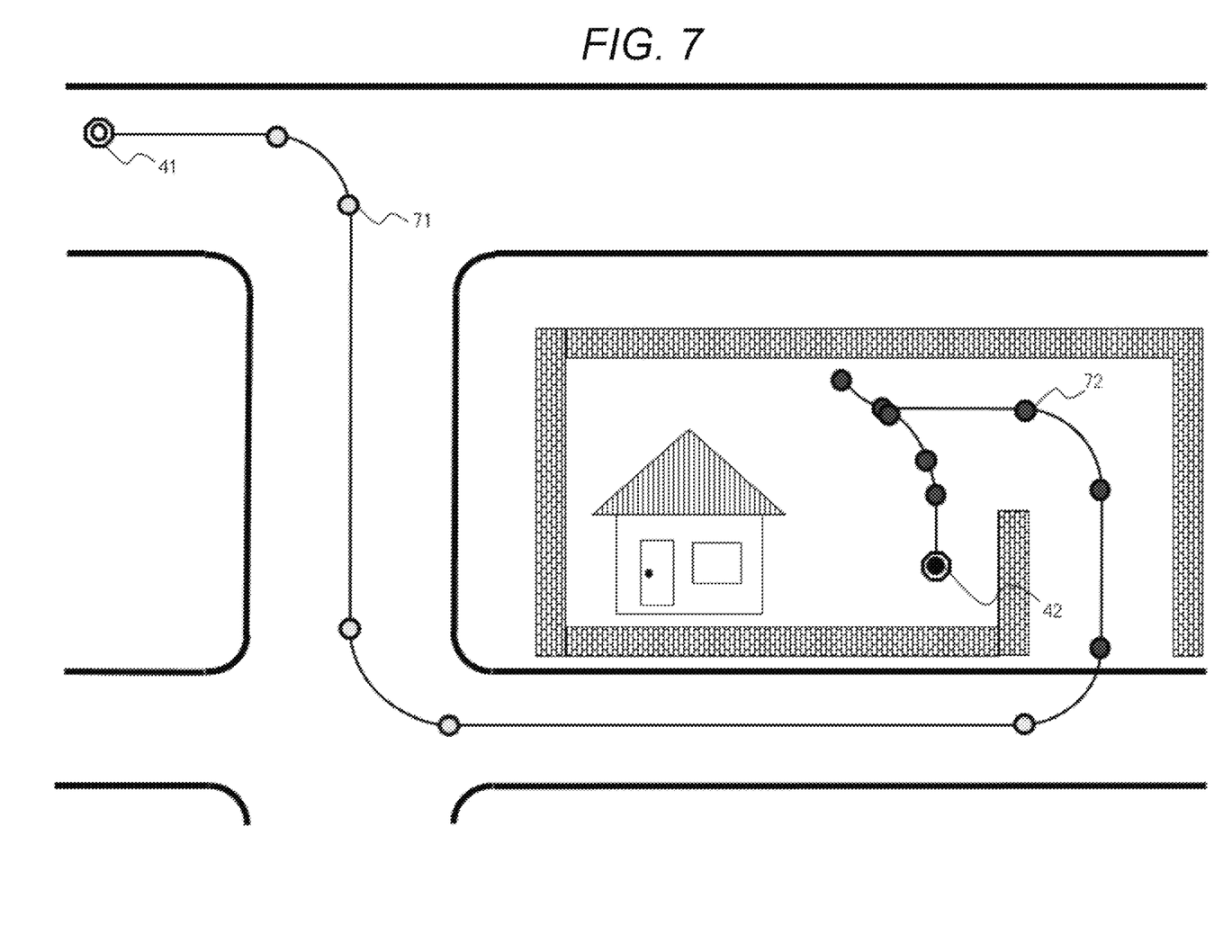
FIG. 7 is a plan view of an example in which whether determined subject vehicle location information belongs to a public road or a private land is determined, showing the embodiment of the present invention.

FIG. 7 is a diagram showing a case where the long-term storage information determining unit 124 determines whether the determined long-term storage information shown in FIG. 6 belongs to a public road or a private land. For example, the long-term storage information determining unit 124 rounds off location information 71 in units of 10 cm, the location information 71 being long-term storage information determined to be belonging to the public road, and rounds off location information 72 in units of 1 cm, the location information 72 being long-term storage information determined to be belonging to the private land. In addition, the long-term storage information determining unit 124 gives information indicating whether round-off has been carried out in units of 10 cm or that of 1 cm, to the long-term storage information.

The road information acquiring unit 113 may set the distinction between the public road and the private land in advance, or the driver may specify the distinction between the public road and the private land through the driver operation acquiring unit 114.

Figure 3:
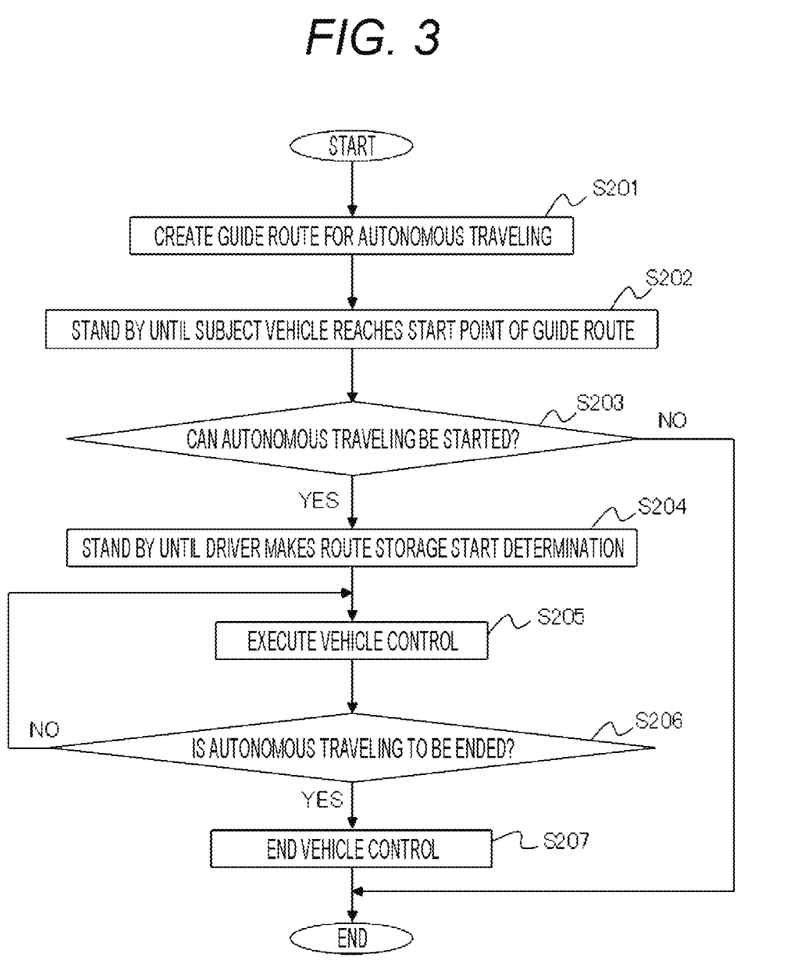
FIG. 3 is a flowchart of an example of processes that the vehicle controller executes when causing a vehicle to perform autonomous traveling based on stored route information, showing the embodiment of the present invention.

Processes the vehicle controller 1 executes during autonomous traveling will be described with reference to FIG. 3. FIG. 3 is a flowchart of an example of characteristic processes by which the vehicle controller 1 executes autonomous traveling, using route information stored by the vehicle controller 1.

In the present embodiment, a scene is assumed where the driver drives the vehicle 100 in manual traveling mode to cause it to approach the start point (storage start point 41) of stored route information. The driver determines timing of switching from manual traveling mode to autonomous traveling mode.

At step S201, the guide route creating unit 126 creates a guide route for autonomous traveling, from long-term storage information stored in the second storage unit 129 (nonvolatile memory). When many calculation resources are used for a guide route creation process, it is desirable that the process be executed right after the vehicle controller 1 is supplied with power. In another case, the guide route creating unit 126 may create the guide route during stoppage of the vehicle 100.

At step S202, the vehicle control unit 127 determines whether the vehicle 100 has reached the start point (storage start point 41) of the guide route. This determination is made by comparing location information of the vehicle 100 with the location information 61 on the guide route (approximate curve 51). When it is determined that the vehicle 100 has reached the start point (storage start point 41) of the guide route, a process of step S203 is executed. When it is determined that the vehicle 100 has not reached the start point of the guidance route yet, the processes of the steps preceding step S203 are repeatedly executed.

At step S203, the vehicle control unit 127 determines whether autonomous traveling can be started. A condition for starting autonomous traveling is, for example, that the vehicle controller 1 has not detect any problem. When the condition for starting autonomous traveling is not met, the vehicle control unit 127 does not start autonomous traveling. When the condition for starting autonomous traveling is met, the vehicle controller executes a process of step S204.

At step S204, the vehicle control unit 127 informs the driver that autonomous traveling is executable. At the same time, the vehicle control unit 127 acquires an input operation from the driver operation acquiring unit 114, and determines whether the driver is requesting the start of autonomous traveling.

When the driver is not requesting the start of autonomous traveling, the vehicle control unit 127 does not start autonomous traveling, and stands by until receiving the next input operation by the driver. It should be noted that, at the start of autonomous traveling, because the driver drives the vehicle 100 in manual traveling mode, an input operation by using the steering switch, the voice, or the driver monitoring camera is preferable. When the vehicle control unit 127 determines that the driver is requesting the start of autonomous traveling, a process of S205 is executed.

At step S205, the vehicle control unit 127 controls vehicle 100 to cause it to travel along the guide route (approximate curve 51).

Subsequently, at step S206, the vehicle control unit 127 determines whether or not to end autonomous traveling. Conditions for ending autonomous traveling include, for example, a condition that the vehicle 100 has reached the end point (storage end point 42) of the guide route, and a condition that the driver has inputted a request for ending autonomous traveling. When the condition for ending autonomous traveling is met, a process of step S207 is executed. When the condition for ending autonomous traveling is not met, the process flow returns to step S205, at which control of the vehicle is executed continuously.

At step S207, the vehicle control unit 127 ends control of the vehicle 100, thus ending autonomous traveling. At this step, in a case where the vehicle 100 is parked in a parking location (storage end point 42), a parking brake and a side brake are automatically operated. In a case where the vehicle 100 is traveling, on the other hand, it is desirable that the driver be informed of the end of autonomous traveling and that traveling mode be switched gradually to manual traveling mode.

In this manner, a feature level is calculated from short-term storage information, which is acquired at the time of route information storage, and long-term storage information is determined in accordance with the feature level and is stored in the second storage unit 129 (nonvolatile memory). This allows a reduction in the size of data stored in the second storage unit 129 (nonvolatile memory).

In addition, by setting the feature level on the basis of a route creation algorithm, only the information necessary for creating a guide route can be stored as long-term storage information. This allows a further reduction in the size of data stored in the nonvolatile memory. Further, data representing long-term storage information is rounded off, based on the required precision of the guide route. This allows a further reduction in the size of data stored in the second storage unit 129 (nonvolatile memory).

According to the above embodiment, a process of determining long-term storage information is carried out after the end of route information storage. This allows implementation of data processing, such as curve fitting to be carried out on all pieces of short-term storage information. Hence the influence of noise and errors included in short-term storage information can be reduced.

In addition, at the time of guide route creation, only the information necessary for route creation is already saved as long-term storage information. It is expected, therefore, that processing load involved in a guide route creation process is reduced.

The preferred embodiment of the present invention has been described above. It should be noted, however, that the present invention is not limited in any form by the above-described embodiment and that the invention can be implemented as various modifications in a range where such modification does not deviate from the substance of the present invention.

The first storage unit 128 may be a non-volatile storage medium that can be accessed randomly. In this case, the vehicle controller 1 can retain short-term storage information even if power supply is cut off after the vehicle reaches the storage end point 42. A process of selecting long-term storage information, therefore, may be executed after an ignition key is turned on in the next round of traveling after power supply is cut off.

In addition, the vehicle controller 1 executes the processes of FIG. 2 during autonomous traveling to be able to update the content of long-term storage information stored in the second storage unit in accordance with the required location precision of a guide route. At a point of the same traveling distance from the storage start point 41, the long-term storage information determining unit 124 calculates new long-term storage information from a difference between the location of long-term storage information stored in the second storage unit 129 and the location of long-term storage information determined in the current round of route information storage, thereby updating the content of long-term storage information.

In this case, when route information is information about a private road, the long-term storage information determining unit 124 may store long-term storage information determined in the round before the last round of route information storage, in the second storage unit 129, and calculate new long-term storage information from a difference between long-term storage information determined in the round before the last round, long-term storage information determined in the last round, and long-term storage information determined in the current round, thereby updating the long-term storage information.

Figure 9:
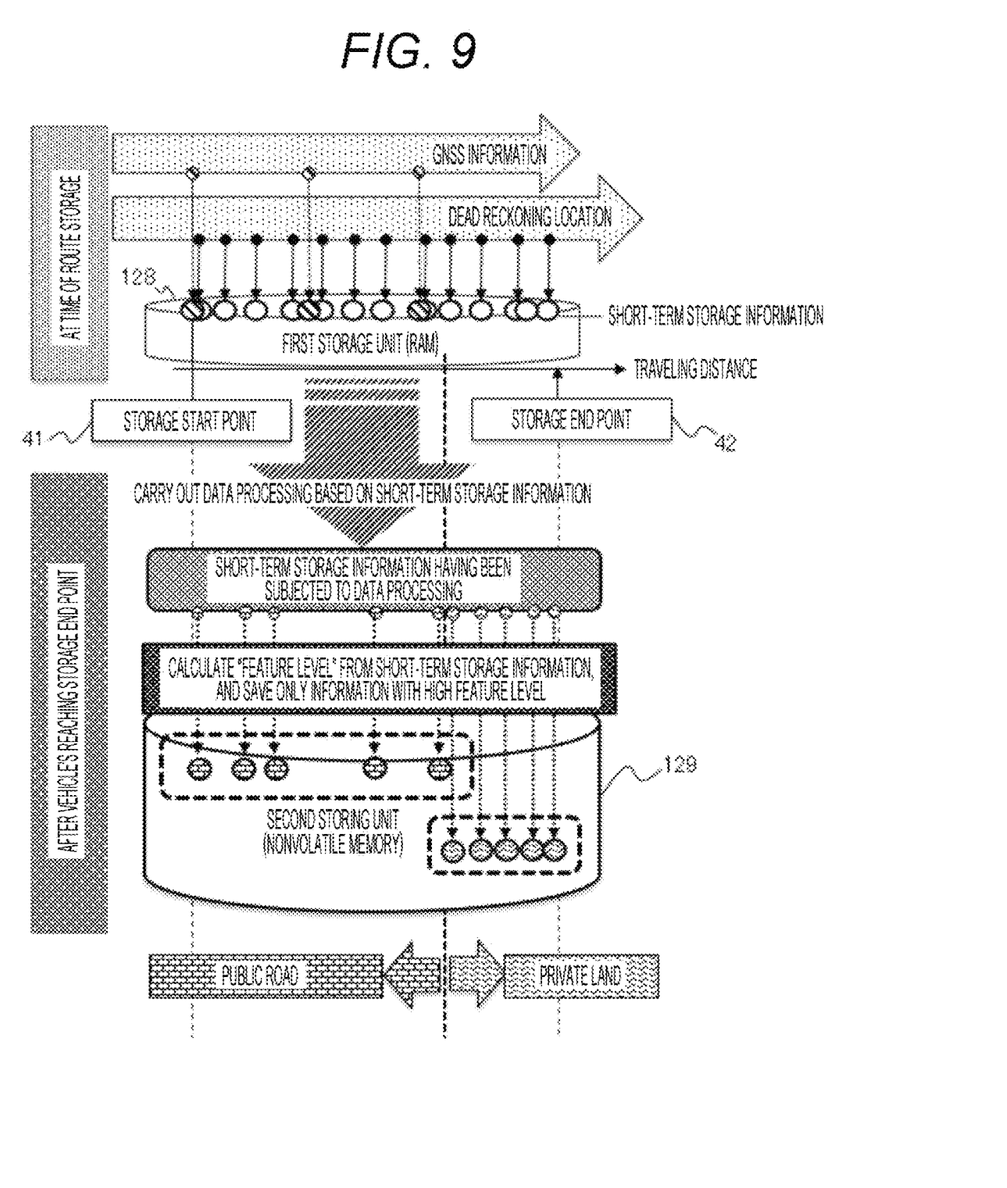
FIG. 9 is a diagram schematically showing a process carried out by the vehicle controller, showing the embodiment of the present invention.

Further, as indicated in FIG. 9, the long-term storage information determining unit 124 may change a given value for selecting long-term storage information, thus chaining the density of pieces of the long-term storage information selected, according to whether route information is about a public road or a private land. FIG. 9 is a diagram schematically showing a processes carried out by the vehicle controller 1.

In a private land section, the long-term storage information determining unit 124 sets a given value for a feature level lower, the given value for the feature level being used when short-term storage information with a high feature level is selected as long-term storage information. As a result, the density of pieces of long-term storage information is increased in a private land where autonomous parking is performed. This ensures the high precision of vehicle control.

CONCLUSION

As described above, the vehicle controller 1 of the above embodiment can have the following configuration.

"A vehicle controller (1) that includes a processor (12A), a first storage unit (128), and a second storage unit (129) and that stores route information indicating a route to a target point (storage end point 42), the vehicle controller (1) comprising:

a traveling state acquiring unit (112) that acquires route information on a vehicle (100); a short-term storage information processing unit (short-term storage information determining unit 122, short-term storage information saving unit 123) that stores the route information in the first storage unit (128), as short-term storage information, the route information being acquired by the traveling state acquiring unit (112) while the vehicle (100) is traveling; and a long-term storage information processing unit (long-term storage information determining unit 124, long-term storage information saving unit 125) that after the vehicle (100) has reached the target point (42), determines long-term storage information from short-term storage information stored in the first storage unit (128), the long-term storage information processing unit storing the determined long-term storage information in the second storage unit (129).

According to the above configuration, the vehicle controller 1 stores short-term storage information in the second storage unit 129 as long-term storage information, the short-term storage information being selected out of pieces of short-term storage information acquired at the time of route information storage. This allows a reduction in the size of data stored in the second storage unit 129.

(2) The vehicle controller for the vehicle (100) according to (1), wherein the long-term storage information processing unit (124, 125) calculates a feature level of each of pieces of the short-term storage information, and stores short-term storage information with the feature level equal to or higher than a given value in the second storage unit (129), as long-term storage information.

According to the above configuration, the vehicle controller 1 calculates a feature level from short-term storage information acquired at the time of route information storage, determines long-term storage information in accordance with the calculated feature level, and stores the determined long-term storage information in the second storage unit 129 (nonvolatile memory). This allows a reduction in the size of data stored in the second storage unit 129.

(3) The vehicle controller for the vehicle (100) according to (1), further comprising a guide route creating unit (126) that creates a guide route, using long-term storage information stored in the second storage unit (129), the guide route being used for carrying out control of the vehicle (100).

According to the above configuration, the guide route creating unit 126 can create a guide route for autonomous traveling, from location information 61 and curvature information 62 between two points, both information being included in short-term storage information.

(4) The vehicle controller for the vehicle (100) according to (3), further comprising a vehicle control unit (127) that carries out control of the vehicle (100), using the guide route.

According to the above configuration, the vehicle control unit 127 can control the vehicle 100 in such a way as to cause the vehicle 100 to travel along a guide route created by the guide route creating unit 126.

(5) The vehicle controller for the vehicle (100) according to (3), wherein the long-term storage information processing unit (124, 125) updates content of long-term storage information stored in the second storage unit (129), based on required location precision of the guide route.

According to the above configuration, while the vehicle is traveling from the storage start point 41 to the storage end point 42, long-term storage information is updated according to the required location precision of the guidance route. This allows storage of long-term storage information with high precision.

(6) The vehicle controller for the vehicle (100) according to (2), wherein the long-term storage information processing unit (124, 125) carries out data processing on the short-term storage information, and calculates a feature level, based on the short-term storage information subjected to the data processing.

According to the above configuration, the long-term storage information processing unit (the long-term storage information determining unit 124) carries out prescribed data processing (e.g., curve fitting) on short-term storage information, and calculates a feature level from the short-term storage information subjected to the data processing. This allows a reduction in the effects of noises and errors included in the short-term storage information.

(7) The vehicle controller for the vehicle (100) according to (2), wherein the long-term storage information processing unit (124, 125) informs the driver of a status of calculation of the feature level.

According to the above configuration, when storing determined long-term storage information in the second storage unit 129, the long-term storage information saving unit 125 informs the driver that a process of determining long-term storage information is being executed and long-term storage information is being saved. This prompts the driver to avoid turning off the power supply of the vehicle 100.

It should be noted that the present invention is not limited to the above-described embodiments but include various modifications. For example, the embodiments have been described above in detail for easy understanding of the present invention, and are not necessarily limited to an embodiment encompassing all constituent elements described herein. Some constituent elements of a certain embodiment may be replaced with constituent elements of another embodiment, and a constituent element of another embodiment may be added to a constituent element of a certain embodiment. In addition, some constituent elements of each embodiment may be added to, deleted from, or replaced with constituent elements of anther embodiment, and such addition, deletion, and replacement may be implemented separately or in a combined form.

Some or all of the above-described constituent elements, functions, processing units, processing means, and the like may be provided in the form of hardware, such as properly designed integrated circuits. In addition, the above-described constituent elements, functions, and the like may be provided in the form of software-based programs by causing a processor to interpret and execute programs for implementing the constituent elements/functions. Information for implementing functions, such as programs, tables, and files, may be stored in a storage device, such as a memory, a hard disk, and a solid state drive (SSD), or in a recording medium, such as an IC card, an SD card, and a DVD.

A group of control lines/data lines considered to be necessary for description are illustrated, and all control lines/information lines making up the product are not necessarily illustrated. It is safe to assume that, actually, almost the entire constituent elements are interconnected.

REFERENCE SIGNS LIST 1 vehicle controller
11 input device
12 autonomous driving control device
13 output device
12A CPU
12B storage device
100 vehicle
111 surrounding environment information acquiring unit
112 traveling state acquiring unit
113 road information acquiring unit
114 driver operation acquiring unit
121 storage start/end determining unit
122 short-term storage information determining unit
123 short-term storage information saving unit
124 long-term storage information determining unit
125 long-term storage information saving unit
126 guide route creating unit
127 vehicle control unit
128 first storage unit
129 second storage unit

The invention claimed is:

1. A vehicle controller that includes a processor, a first storage unit, and a second storage unit and that stores route information indicating a route to a target point, the vehicle controller comprising:
  a traveling state acquiring unit that acquires route information on a vehicle;
  a short-term storage information processing unit that stores the route information in the first storage unit, as short-term storage information, the route information being acquired by the traveling state acquiring unit while the vehicle is traveling;
  a long-term storage information processing unit that after the vehicle has reached the target point, determines long-term storage information from short-term storage information stored in the first storage unit, the long-term storage information processing unit storing the determined long-term storage information in the second storage unit; and
  a guide route creating unit that creates a guide route, using long-term storage information stored in the second storage unit, the guide route being used for carrying out vehicle control,
  wherein the long-term storage information processing unit updates content of long-term storage information stored in the second storage unit, based on required location precision of the guide route.

2. The vehicle controller according to claim 1, wherein the long-term storage information processing unit calculates a feature level of each of pieces of the short-term storage information, and stores short-term storage information with the feature level equal to or higher than a given value, in the second storage unit, as long-term storage information.

3. The vehicle controller according to claim 1, further comprising a vehicle control unit that carries out vehicle control, using the guide route.

4. The vehicle controller according to claim 2, wherein the long-term storage information processing unit carries out data processing on the short-term storage information, and calculates a feature level, based on the short-term storage information subjected to the data processing.

5. The vehicle controller according to claim 2, wherein the long-term storage information processing unit informs a driver of a status of calculation of the feature level.

* * * * *